United States Patent [19]

Spaulding et al.

[11] Patent Number: 4,561,808

[45] Date of Patent: Dec. 31, 1985

[54] POWDER FEED PICKUP DEVICE FOR THERMAL SPRAY GUNS

[75] Inventors: Mark F. Spaulding, Rockville Center; Richard A. Goehring, Huntington Station, both of N.Y.

[73] Assignee: METCO Inc., Westbury, N.Y.

[21] Appl. No.: 616,642

[22] Filed: Jun. 4, 1984

[51] Int. Cl.[4] .......... B65G 53/42

[52] U.S. Cl. .......... 406/118; 406/144

[58] Field of Search .......... 406/118, 138, 144, 146; 239/74, 79, 80, 85

[56] References Cited

U.S. PATENT DOCUMENTS

| | | | |
|---|---|---|---|
| 2,518,514 | 8/1950 | Anderson | 406/118 |
| 3,179,378 | 4/1965 | Zenz et al. | 406/138 X |
| 3,281,077 | 10/1966 | Cape | 239/85 |
| 3,501,097 | 3/1970 | Daley | 239/85 |
| 3,514,905 | 6/1970 | King et al. | 406/118 X |
| 3,826,540 | 7/1974 | Jensen | 406/138 X |
| 3,976,332 | 8/1976 | Fabel | 406/146 X |
| 4,377,257 | 3/1983 | Geise | 239/433 X |
| 4,391,860 | 7/1983 | Rotolico et al. | 406/118 X |

FOREIGN PATENT DOCUMENTS

| | | | |
|---|---|---|---|
| 173356 | 12/1952 | German Democratic Rep. | 406/144 |
| 341433 | 11/1959 | Switzerland | 406/144 |

*Primary Examiner*—Jeffrey V. Nase

*Attorney, Agent, or Firm*—H. S. Ingham; F. L. Masselle; E. T. Grimes

[57] ABSTRACT

A powder feeding system for a thermal spray gun provides uniform control of powder feed rate with a minimum of pulsation during operation and without feeding during idle mode. The feeder is comprised of an enclosed hopper for containing a powder to be thermal sprayed, a carrier conduit connected between a carrier gas supply and a thermal spray gun, a feed gas conduit for discharging a regulated supply of feed gas under pressure into the hopper, and one or preferably more powder intake orifices extending from the carrier conduit into the hopper below the normal minimum level of powder. The intake conduits have a geometric design and arrangement such that there is no gravity flow of powder therethrough into a carrier gas stream in the absence of a feed gas flow therethrough. The axes of the intake orifices extend away from the carrier conduit at an acute angle to the axis of the carrier conduit as defined by the direction of carrier gas flow. Preferably there is a constriction in the carrier conduit downstream of the intake orifices.

25 Claims, 4 Drawing Figures

POWDER FEED PICKUP DEVICE FOR THERMAL SPRAY GUNS

This invention relates to powder pickup device in a powder feeder for thermal spray guns which provides improved feeding performance.

BACKGROUND OF THE INVENTION

Thermal spraying, also known as flame spraying, involves the heat-softening of heat-fusible material, such as a metal or ceramic, and the propelling of the softened material in particulate form against a surface to be coated to which the heat-fusible material bonds. A thermal spray gun is usually used for this purpose and, with one type, the heat-fusible material is supplied in powder form to the gun. The powder is of quite small particle size, e.g., below about 100 mesh U.S. Standard screen size to as small as one micron, and is difficult to meter and control.

A thermal spray gun normally utilizes a combustion or plasma flame to effect melting of the powder, but other heating means, such as electric arcs, resistance heaters or induction heaters can also be used, alone or in combination. In a powder-type combustion thermal spray gun, the carrier gas for the powder can be one of the combustion gases or compressed air. In a plasma spray gun, the carrier gas is generally the same as the primary plasma gas, although other gases such as hydrocarbon are used in special cases.

To obtain high quality coatings, it is necessary to accurately control the rate of the powder fed through the gun and to maintain the rate constant for a given set of spray conditions. The type of fine powder used is a very difficult material to handle and to feed with any uniformity into a carrier gas. While various apparatus of different designs and modes of operation based on gravity, mechanical and gas conveying, and combinations thereof, have been proposed such devices almost universally suffer from a lack of reliability in maintaining a constant controlled powder feed rate and are often subject to mechanical wear and breakdown. A contributing factor is the wide range of powder sizes, materials and particle shapes used for thermal spraying.

The present invention pertains to and is an improvement over the thermal spray powder feeder of the general types described in U.S. Pat. Nos. 3,976,332 and 4,381,898. In U.S. Pat. No. 3,976,332, for example, there is disclosed a powder feeding system comprising an enclosed hopper for containing powder in loose particulate form. A carrier gas conduit connected to a carrier gas supply extends through the hopper in its lower portion and continues to a point of powder-carrier gas utilization. The carrier gas conduit has connected thereto a powder intake orifice which extends into the hopper below the level of the powder and has a geometric design and arrangement such that there is no gravity flow of the powder therethrough into a carrier gas stream in the carrier gas conduit in the absence of a fluidizing gas flow therethrough.

Fluidizing gas in a regulated amount is supplied to the hopper, for example, above the level of solids therein so that in passing to the orifice the gas must pass through the mass of solids and be diffused thereby. The design of the hopper is such that the gas converges towards the powder intake conduit and fluidizes the powder in a fluidized zone in the immediate vicinity thereof, the powder surrounding the fluidized zone being non-fluidized and acting as a diffusion region for introducing the fluidized gas uniformly into the fluidized zone.

As further disclosed in U.S. Pat. No. 3,976,332, the carrier gas is supplied in a predetermined, constant amount. The flow of the fluidizing gas is regulated in a manner disclosed in U.S. Pat. No. 3,501,097, by sensing the pressure at a point in the carrier gas line, which pressure is responsive to the mass flow rate of solids therethrough, and then using the change in the pressure in the conveying gas line, if any, to regulate the flow of the fluidizing gas. If the pressure should increase, the flow of the fluidizing gas is made to decrease, and vice versa.

It has been found that the type of system of U.S. Pat. No. 3,976,332 has excellent repeatability and uniform control of the powder feed rate. However, certain problems became apparent, especially with very fine, difficult-to-feed ceramic powders. One such problem is pulsation, apparently due to a pressure oscillation, resulting in uneven thermal sprayed coating layers. Experimental use of several powder intake conduits relieved this problem but another problem developed, which was a continuation of powder feeding when the fluidizing gas is shut off. This continuation of feeding has been speculated to be due to a portion of carrier gas exiting one intake conduit and carrying powder into another.

Therefore, an object of the present invention is to provide an improved powder feeding system for a thermal spray gun which provides uniform control of powder feed rate with reduced pulsation and which does not feed into the carrier gas during idle mode.

Another object is to provide a novel powder pickup device for a powder feeding system which provides improved control of the powder feeding.

BRIEF DESCRIPTION OF THE INVENTION

The foregoing and other objects of the present invention are achieved by a powder pickup device for a powder feeder for a thermal spray gun, in which the feeder is comprised of an enclosed hopper for containing a powder to be thermal sprayed, a carrier conduit connected between a carrier gas supply and a thermal spray gun, a feed gas conduit for discharging a regulated supply of feed gas under pressure into the hopper, and one or preferably more powder intake orifices extending from the carrier conduit into the hopper below the normal minimum level of powder. The intake conduits have a geometric design and arrangement such that there is no gravity flow of powder therethrough into a carrier gas stream in the absence of a feed gas flow therethrough. The axes of the intake orifices extend away from the carrier conduit at an acute angle to the axis of the carrier conduit as defined by the direction of carrier gas flow. Preferably there is a constriction in the carrier downstream of the intake orifices.

DETAILED DESCRIPTION OF THE INVENTION

Figure 1:
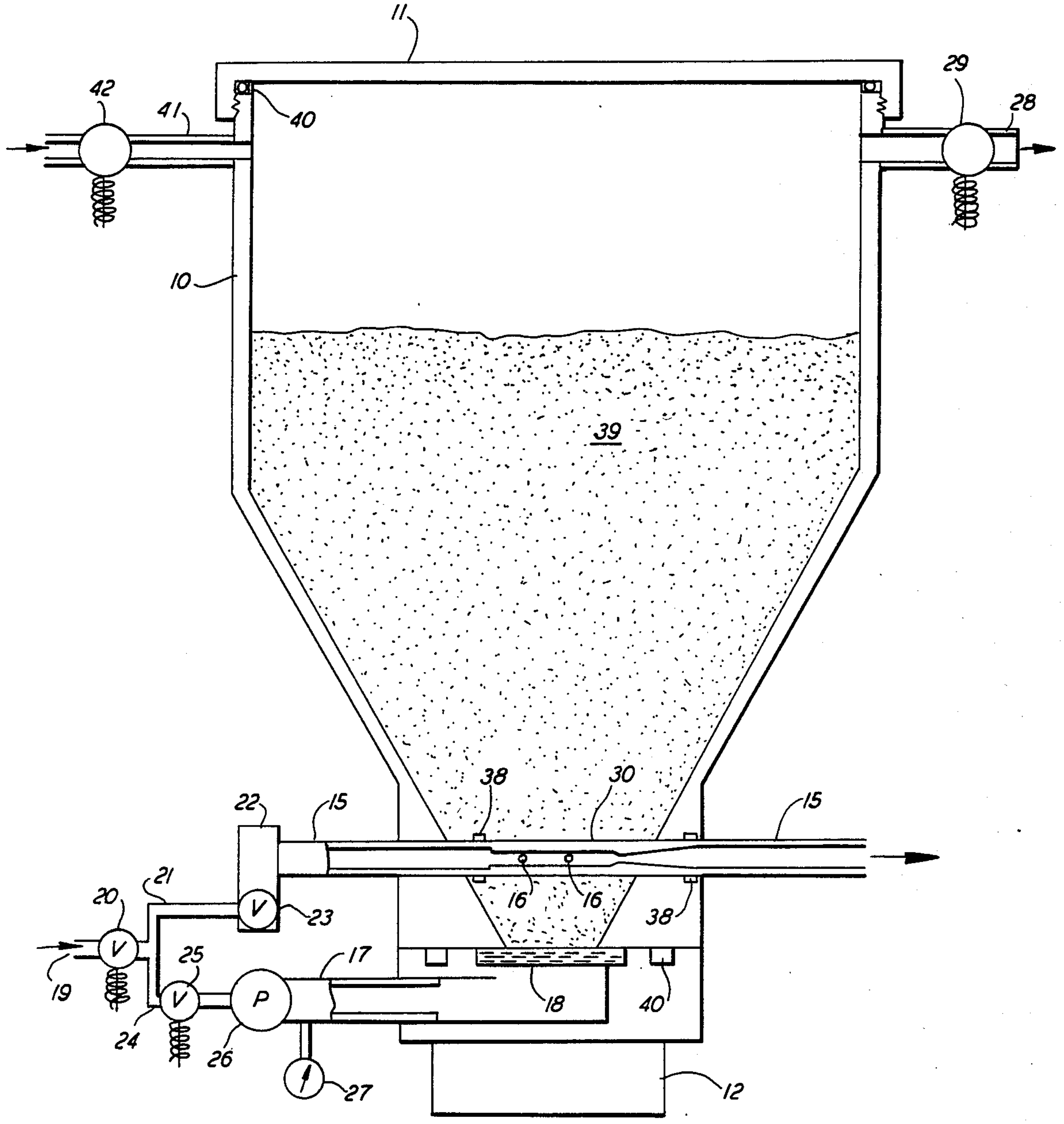
FIG. 1 is a simplified schematic illustration in vertical section of a preferred type of powder feeder incorporating the present invention.

With reference to FIG. 1, a supply hopper 10 contains powder such as a very fine composite aluminum oxide-titanium oxide powder 39 having a particle size predominantly in the range of −325 mesh (U.S. Standard Sieve) to +5 microns. The hopper has an inlet cover 11 for the periodic addition of powder. It can be equipped with a vibrator 12 which is used, as necessary, to maintain the powder in loose free-flowing form and permeable to the passage of gas. The hopper is capable of being pressurized and is appropriately sealed with o-rings 40 or the like.

Passing through the bottom portion of the hopper is a carrier gas conduit 15 incorporating a powder pickup device 30 which has powder intake orifices 16 within the hopper below the level of the powdered solids. Fluidizing feed gas is admitted to the hopper, preferably at a point external to any zone of fluidization of the solids in the immediate vicinity of intake orifices 16. As shown, the feed gas is admitted to the bottom of the hopper by tube 17 and passes through the static mass of solids to the zone of fluidization. Powder is entrained by the feed gas through the orifices 16 and into the carrier conduit 15 where the carrier gas conveys the powder to a thermal spray gun (not shown).

A porous member 18 is located at the entrance of the feed gas conduit 17 into the hopper so as to diffuse the feed gas into the powder in the hopper. The purpose is to diffuse the feed gas into the powder at a location remote from any zone of fluidization of the solids in the immediate vicinity of orifices 16.

Gas is supplied from a gas source (not shown) to the system by way of line 19, which has a solenoid shut-off valve 20 therein. A portion of the gas is passed to the carrier gas conduit 15 through branch conduit 21 and flowmeter 22 which has a control valve 23 for metering a desired, constant mass flow rate of gas through the carrier gas conduit 15.

A second and smaller portion of the gas supply is passed through branch conduit 24, solenoid shut-off valve 25 and pressure regulator 26 into the feed qas conduit 17. Th8 pressure regulator is preset to maintain a supply of feed 9as into the hopper at a relatively low, constant pressure, for example, in the range of 0.03 to 4 bar (0.5 to 6 psi). The pressure regulator functions in a manner taught in aforementioned U.S. Pat. No. 3,501,097, i.e. the powder feed is controlled at a constant rate by the regulated amount of feed gas, the amount of powder being controlled responsive to the pressure drop in the conveying gas line downstream of the point of powder introduction. As further taught in U.S. Pat. No. 3,501,097, a pressure gage 27 connected to the feed gas conduit 17 may be provided as a relative indicator of powder feed rate.

A vent 28 near the top of hopper 10 is used to vent the hopper when the feed gas is shut off. A solenoid valve 29 is provided for the purpose.

Figure 2:
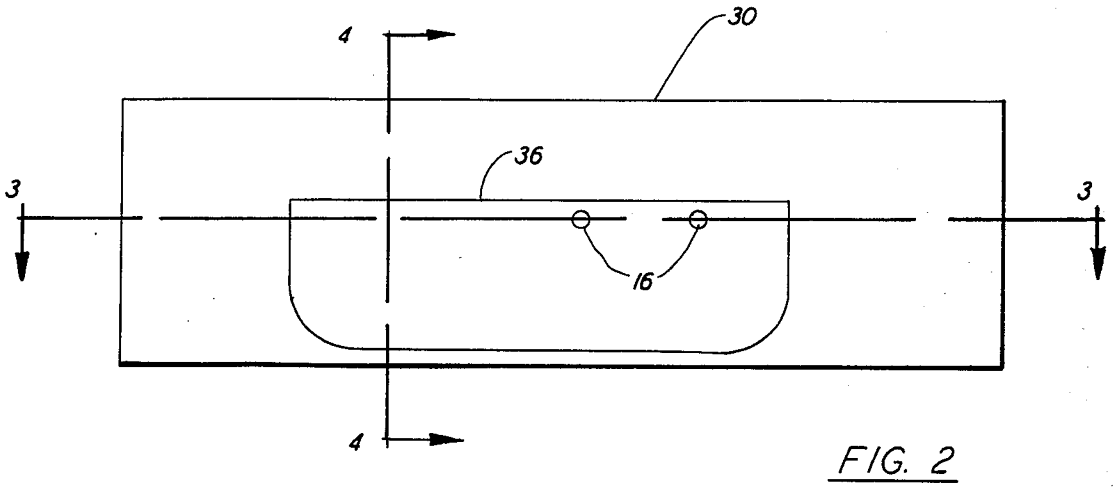
FIG. 2 shows the side elevational view of a powder pickup device (element 30, FIG. 1) according to a preferred embodiment of the present invention.
Figure 3:
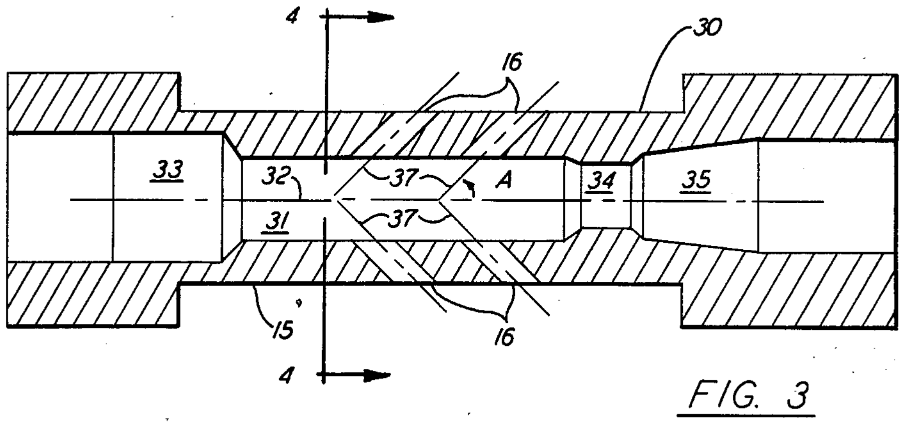
FIG. 3 is a longitudinal sectional view in the direction of the arrows along the line 3—3 in FIG. 2.

A powder pickup device 30 of a desired design is shown in FIG. 2 and in FIG. 3 which is a sectional view taken in a horizontal plane. The device is formed of an elongated member which has an axial bore 31 therethrough and is attached into the carrier conduit 15 in any desired or known manner such as with threaded fittings or the like (shown schematically as 38 in FIG. 1) so as to constitute a portion of the carrier conduit. The device is positioned in the hopper below the normal minimum level of powder, preferably leaving sufficient volume of powder in the hopper surrounding the device to provide for a zone of fluidization surrounded by non-fluidized powder.

In the powder pickup region at least one and preferably four powder intake orifices 16 extend away from respective points of intersection with the axial bore 31 of the pickup device 30 at an acute angle A which should be the same for all of the intake orifices and is preferably between about 30° and about 70°, and most preferably about 45° with the axis 32 of the bore. The acute angle A is measured with respect to the direction of carrier gas flow as depicted in FIG. 3. The four orifices 16 are desirably arranged in pairs, the orifices of each pair lying opposite each other such that the two axes 37 of a pair intersect in the bore 31 substantially on the axis 32 of the bore. The axes 37 preferably lie in a generally horizontal plane, with one pair separated from the other pair by a distance on the axis of bore 31 between about 1 and about 10 times the average diameter of the bore 31 in the pickup region.

In the present example the intake orifices 16 are 1.09 mm (0.043 inch) diameter. Orifice size may vary according to circumstances, for example up to 4 mm (0.16 inch) diameter.

Downstream of the pickup location there is a constriction 34 in the bore of the carrier conduit. In one practical embodiment, constriction 34 is located within about 5 cm (2 inches) from the intake orifice closest to the constriction. It has been discovered that the constriction contributes to the desirable prevention of powder feeding in the absence of feed gas flow, possibly by minimizing any pressure differential between the pairs of pickup orifices. The constriction 34 has a cross-sectional area less than that of the bore 31 in the pickup region, and should be between about 0.1 and 0.9 times and preferably between about 0.3 and 0.6 times the cross-sectional area of the bore 31. In the embodiment of the present example the diameter of the constriction is 1.6 mm (1/16 inch).

Desirably the inside diameter of the carrier conduit is expanded in the region 35 downstream of the constriction 34, to the known or desired diameter of a powder feed conduit adapted to the requirements of gas flow, powder feed rate and powder type.

Figure 4:
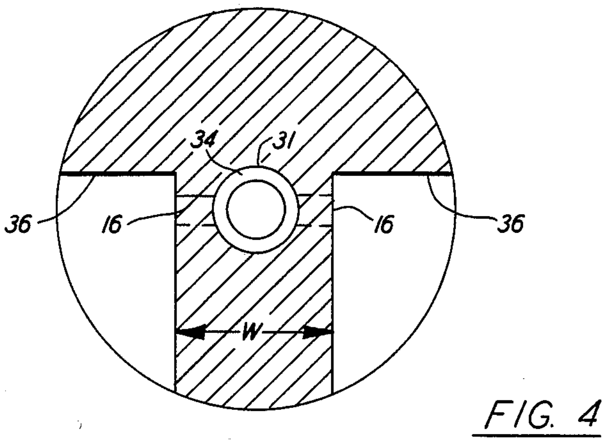
FIG. 4 is a transverse sectional view on line 4—4 in FIG. 2 and FIG. 3 in the direction of the arrows.

A further embodiment is also depicted in FIG. 2 and FIG. 4 which is a transverse cross section of the powder pickup device 30. The bore 31 and constriction 34 are indicated centrally therein, as are a pair of powder intake orifices 16 lying in a horizontal plane in the device. On each side an overhang 36 is longitudinal with and extends away from the vertical plane at the powder inlet of each orifice 16 to a line that is vertically above and horizontally beyond the inlet, so as to prevent gravity flow of the powder through the orifice into the carrier gas stream in the absence of feed gas flow. Conveniently the powder pickup device is machined from rod such as 9.5 mm (⅜ inch) diameter, thus forming, in part, the overhang with a rounded cross-sectional top. The width W is, for example, 3.2 mm (⅛ inch).

As an alternative to the aforementioned configuration having horizontal orifices and with overhangs, the overhang may be omitted so long as there is no gravity feed into the carrier conduit. Orifices which have a length substantially greater than diameter and thus allow bridging of the powder therein may suffice but, with no overhang, at least partially downward-facing orifices are preferable as taught in U.S. Pat. No. 3,976,332.

In operation, in idle mode before the thermal spray gun is to be used, valve 20 if opened and the control valve 23 is preset to provide the desired carrier gas flow rate through the carrier conduit. At that stage solenoid valve 25 is closed and solenoid valve 29 is open. Pressure regulator 26 may be preset for a given powder and desired feed rate. Alternatively valve 25 may be kept open or even omitted and regulator 26 set for zero pressure when the feeder is in the off mode.

To start, the system valve 25 is opened (or regulator adjusted to the desired pressure) to commence flow of feed gas. Simultaneously vent valve 29 is closed. Pressure in the hopper builds up rapidly and powder is entrained in a zone of fluidization near the intake orifices and carried therethrough into the axial bore of the pickup device, whereby a mixture of carrier gas, feed gas and powder travel through the carrier conduit to the thermal spray gun. To stop the operation, the procedure is reversed; thus valve 25 is turned off and vent valve 29 is opened.

An optional means for introducing the fluidizing feed gas is by way of tube 41 connected near the top of the hopper, preferably above the normal maximum level of powder as disclosed in aforementioned U.S. Pat. No. 3,976,332. Shutoff of the feed gas is accomplished with solenoid valve 42. The feed gas is received through a tube (not shown) connected to the same branch source as tube 24 which, with its associated components thru porous member 18, is eliminated and replaced by the feed system of tube 41.

A preferable system utilizes tube 41 near the top of the hopper and, additionally, retains the tube 24 and its associated components for introducing feed gas at the bottom of the hopper. To start feeding with this preferred system, after the carrier gas is flowing, valve 42 is opened for about 2 to 3 seconds to pressurize the hopper, then closed. Essentially simultaneously upon shutoff of valve 42, valve 26 is opened to commence the discharge of feed gas into the bottom of the hopper, and the feeder is thereafter operated as described hereinabove. The advantage discovered for the initial pressurization is to facilitate a more rapid buildup to full powder feed rate.

The system described herein has been shown to feed a variety of powders, including very fine and difficult-to-feed types. There is excellent reliability and control of feed rates, with a minimum of pulsation during operation and without feeding during the shut-off mode while only the carrier gas is flowing.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A powder feeding system for a thermal spray gun, comprising:
   - an enclosed hopper for a powder to be thermal sprayed in loose particulate form;
   - a feed gas conduit adapted to discharge a regulated amount of feed gas under pressure into the hopper; and
   - a carrier conduit for a carrier gas stream, connected to a carrier gas supply and extending to a point of powder carrier gas utilization;
   - the carrier conduit having a plurality of powder intake orifices communicating with the carrier conduit at a pickup location situated between the carrier gas supply and the point of utilization, the intake orifices extending into the hopper below the normal minimum level of the powder and having a geometric design and arrangement such that there is no gravity flow of powder therethrough into the carrier gas stream in the absence of a feed gas flow therethrough, wherein the axes of the intake orifices extend away from the carrier conduit at an acute angle to the axis of the carrier conduit with respect to the carrier gas stream.

2. The powder feeding system of claim 1, wherein the acute angle is between about 30° and about 70°.

3. The powder feeding system of claim 1 further comprising a pressure regulator adapted to discharge a regulated amount of feed gas into the hopper.

4. The powder feeding system of claim 1, wherein the carrier conduit has at least four intake orifices.

5. The powder feeding system of claim 1, wherein the axes of the intake orifices lie in a horizontal plane.

6. The powder feeding system of claim 1, wherein a first pair of intake orifices have axes intersecting each other at a first point located in the carrier conduit, and a second pair of intake orifices have axes intersecting each other at a second point located in the carrier conduit.

7. The powder feeding system of claim 5, further comprising an overhand longitudinal with and extending from the carrier conduit to a line separated vertically upwards from and horizontally away from the inlets of the intake orifice so as to prevent gravity flow of the powder therethrough into the carrier gas stream in the absence of feed gas therethrough.

8. The powder feeding system of claim 6, wherein the separation between the first and second points is between about 1 and about 10 times the average diameter of the carrier conduit at the pickup location.

9. The powder feeding system of claim 6, wherein the acute angles are each about 45°.

10. The powder feeding system of claim 1, wherein the carrier conduit has a constriction therein located at an intermediate point between the pickup location and the point of utilization, the ratio of the cross-sectional area of the constriction to the average cross-sectional area of the carrier conduit at the pickup location being less than 1.

11. The powder feeding system of claim 10, wherein the cross-sectional area of the carrier conduit is uniform in the pickup location, and the constriction ratio is between about 0.1 and about 0.9.

12. The powder feeding system of claim 10 wherein the constriction is separated from the intake orifice closest to the constriction by a distance of less than about 5 cm.

13. The powder feeding system of claim 10 wherein the cross-sectional area of the carrier conduit is expanded from the cross-sectional area at the constriction in the direction of the carrier gas stream.

14. A powder feeding system of claim 1 wherein the feed gas conduit is disposed to discharge the feed gas into the hopper at a location below the normal minimum level of the powder.

15. A powder feeding system of claim 14 further comprising a porous member interposed between the feed gas conduit and the hopper so as to diffuse the feed gas into powder in the hopper and to block backflow of powder into the feed gas conduit in the absence of feed gas flow.

16. The powder feeding system of claim 14, further comprising means for pressurizing the hopper immediately prior to commencement of the discharge of the feed gas into the hopper, so as to facilitate rapid buildup of powder feed rate during startup.

17. The powder feeding system of claim 16, wherein the pressurizing means comprises:

means for admitting pressurizing gas at a point above the level of the powder therein; and a valve for shutting off the pressurizing gas essentially simultaneously with commencement of the discharge of the feed gas into the hopper.

18. A powder feeding system for a thermal spray gun comprising:

an enclosed hopper containing a powder to be flame sprayed in loose particulate form;

a carrier gas conduit connected to a carrier gas supply and extending to a point of powder carrier gas utilization, the carrier gas conduit having a plurality of powder intake orifices communicating with the carrier gas conduit at a pickup location situated between the carrier gas supply and the point of utilization extending into the hopper below the normal minimum level of the powder and having a geometric design and arrangement such that there is no gravity flow of powder therethrough into the carrier gas stream in the absence of a feed gas flow therethrough; and a feed gas conduit adapted to discharge a regulated amount of feed gas under pressure into the hopper at a point remote from a fluidized zone of the powder in the hopper in the immediate vicinity of the intake orifices;

the hopper being adapted to cause the fluidizing gas to pass through the powder therein and converge towards the intake orifices and fluidize the powder in the immediate vicinity thereof, the powder surrounding the fluidized zone being non-fluidized and acting as a diffusing region for introducing fluidized gas uniformly into the fluidized zone; wherein the axes of the powder intake orifices extend away from the carrier conduit at an acute angle to the axis of the carrier conduit with respect to the carrier gas.

19. The powder feeding system of claim 18 wherein a first pair of intake orifices have axes intersecting at a first point in the carrier conduit, and a second pair of intake orifices have axes intersecting at a second point in the carrier conduit.

20. A powder feeding system for a thermal spray gun, comprising:

an enclosed hopper for a powder to be thermal sprayed in loose particulate form;

a feed gas conduit adapted to discharge a regulated amount of feed gas under pressure into the hopper; and a carrier conduit for a carrier gas stream, connected to a carrier gas supply and extending to a point of powder carrier gas utilization, the carrier conduit having four powder intake orifices communicating with the carrier conduit at a pickup location situated between the carrier gas supply and the point of utilization, the intake orifices extending into the hopper below the normal minimum level of the powder and having a geometric design and arrangement such that there is no gravity flow of powder therethrough into the carrier gas stream in the absence of a feed gas flow therethrough; wherein the axes of the intake orifices extend away from the carrier conduit at an acute angle between about 30° and about 70° with the axis of the carrier conduit with respect to the carrier gas stream; and the carrier conduit has a constriction therein located at a distance less than about 5 cm from the intake orifice closest to the constriction, the ratio of the cross-sectional area of the constriction to the average cross-sectional area of the carrier conduit at the pickup location being between about 0.1 and about 0.9.

21. The powder feeding system of claim 20, wherein the axes of the intake orifices lie in a horizontal plane, and the powder feeding system further comprises an overhang longitudinal with and extending from the carrier conduit to a line separated vertically upwards from and horizontally away from the inlets of the powder intake orifices so as to prevent gravity flow of the powder therethrough into the carrier gas stream in the absence of feed gas therethrough.

22. A powder feed pickup device for a thermal spray gun, comprising an elongated member having an axial bore therethrough adapted for connection within an enclosed powder hopper to a carrier conduit so as to direct a carrier gas stream through the axial bore, the elongated member having at least four powder intake orifices having intersections with the axial bore, the intake orifices adapted to extend into an enclosed powder hopper below the normal level of the powder and having a geometric design and arrangment such that there is no gravity flow of powder therethrough in the absence of any gas flow therethrough, wherein the axes of the intake orifices extend away from the axial bore at an acute angle with respect to the carrier gas stream, and the axial bore has a constriction therein at a location separated from the intake orifice intersections in the direction of the carrier gas stream, the ratio of the cross-sectional area of the constriction to the average cross-sectional area of the axial bore at the intake orifice intersections being between about 0.1 and 0.9.

23. The powder feed pickup device of claim 22, wherein the axes of the intake orifices lie in a horizontal plane, and the powder feeding system further comprises an overhang longitudinal with and extending from the carrier conduit to a line separated vertically upwards from and horizontally away from the inlets of the intake orifice so as to prevent gravity flow of the powder therethrough into the carrier gas stream in the absence of feed gas therethrough.

24. A method of feeding powder to a thermal spray gun, comprising the steps of:

providing an enclosed hopper for a powder to be thermal sprayed in loose particulate form;

extending a carrier conduit from a carrier gas supply to a point of powder carrier gas utilization;

extending a plurality of intake orifices from a pickup location in the carrier conduit into the hopper below the normal minimum level of the powder, the extending being away from the carrier conduit at an acute angle to the axis of the carrier conduit with respect to the carrier gas stream, and the intake orifices having such design and arrangement that there is no gravity flow of the powder therethrough into the carrier gas stream in the absence of a feed gas therethrough;

flowing a carrier gas stream from the carrier gas supply through the carrier conduit to the point of powder carrier gas utilization; and discharging a regulating amount of feed gas under pressure into the hopper.

25. The method of claim 24 further comprising the step of pressurizing the hopper immediately prior to commencement of the discharge of the feed gas into the hopper, so as to facilitate rapid buildup of powder feed rate during startup.

* * * * *